(12) United States Patent
Fujita et al.

(10) Patent No.: US 9,744,994 B2
(45) Date of Patent: Aug. 29, 2017

(54) STEERING SYSTEM

(71) Applicant: JTEKT CORPORATION, Osaka-shi, Osaka (JP)

(72) Inventors: Yuji Fujita, Okazaki (JP); Takehide Adachi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 1 day.

(21) Appl. No.: 14/736,931

(22) Filed: Jun. 11, 2015

(65) Prior Publication Data

US 2015/0367887 A1 Dec. 24, 2015

(30) Foreign Application Priority Data

Jun. 20, 2014 (JP) .................................. 2014-126972

(51) Int. Cl.
*G06F 19/00* (2011.01)
*B62D 15/02* (2006.01)
*B62D 5/04* (2006.01)

(52) U.S. Cl.
CPC ........... *B62D 15/021* (2013.01); *B62D 5/049* (2013.01)

(58) Field of Classification Search
USPC ................................................ 701/41, 44, 1
See application file for complete search history.

(56) References Cited

U.S. PATENT DOCUMENTS

| | | | | |
|---|---|---|---|---|
| 6,675,124 B2* | 1/2004 | Koga | .................... | B62D 15/021 324/207.2 |
| 2006/0070794 A1* | 4/2006 | Fujita | ................. | B62D 15/0245 180/446 |
| 2009/0030575 A1* | 1/2009 | Kleinau | .................... | B62D 6/04 701/44 |
| 2014/0360803 A1* | 12/2014 | Hori | ..................... | B62D 5/0484 180/446 |
| 2015/0224845 A1* | 8/2015 | Anderson | ............ | B60G 17/019 701/37 |

FOREIGN PATENT DOCUMENTS

| | | |
|---|---|---|
| EP | 1 225 419 A2 | 7/2002 |
| EP | 2050658 A1 | 4/2009 |
| GB | 2 443 525 A | 5/2008 |

OTHER PUBLICATIONS

Dec. 1, 2015 Extended Search Report issued in European Patent Application No. 15172046.3.

\* cited by examiner

*Primary Examiner* — Ronnie Mancho
(74) *Attorney, Agent, or Firm* — Oliff PLC

(57) ABSTRACT

A steering system includes a rotation angle sensor that detects a signal related to an absolute steering angle, and an assist circuit that acquires the signal related to the absolute steering angle while an ignition switch is off in order to reduce battery consumption. The assist circuit includes a counter that updates a count value based on a result of detection by a first rotating direction determining unit and a second rotating direction determining unit that determine a rotating direction of a motor, and an abnormality detecting unit that detects an abnormality in absolute steering angle based on a past value and a current value of the count value in the counter.

8 Claims, 3 Drawing Sheets

STEERING SYSTEM

INCORPORATION BY REFERENCE

The disclosure of Japanese Patent Application No. 2014-126972 filed on Jun. 20, 2014 including the specification, drawings and abstract, is incorporated herein by reference in its entirety.

BACKGROUND OF THE INVENTION

1. Field of the Invention

The invention relates to a steering system.

2. Description of Related Art

Vehicular systems include various systems such as a steering system, a brake system, a back guide system, and a vehicular stability control system which perform control using an absolute steering angle. For example, in a steering system described in European Patent No. 2050658, the absolute steering angle is detected using an evaluation unit configured as an ASIC including a sensor that can detect a relative steering angle and a counter that increases and decreases a count value in accordance with a relative steering angle signal obtained from the sensor even while an ignition switch is off (during an IG off state). That is, to what period the steering angle corresponds is determined based on the count value, and the absolute steering angle is evaluated using the relative steering angle detected by the sensor.

If an abnormality such as a mismatch between the relative steering angle signal and an increase or a decrease in count value occurs in the evaluation unit, an incorrect absolute steering angle may be detected. Detection of the incorrect absolute steering angle causes a controller for the steering system to perform control based on the incorrect absolute steering angle. Thus, the system in European Patent No. 2050658 detects an abnormality in absolute steering angle as follows. That is, two such counters as described above are provided to make a count function redundant so that an abnormality detecting unit can compare two count values to determine whether the detected absolute steering angle is normal. Upon determining the absolute steering angle to be abnormal, the controller for the steering system stops the control based on the absolute steering angle.

The steering system in European Patent No. 2050658 certainly enables an abnormality in absolute steering angle to be detected. However, the system needs processing time to compare the two count values. The time needed to determine an abnormality in absolute steering angle is also increased by an amount equal to the processing time.

SUMMARY OF THE INVENTION

An object of the present invention is to provide a steering system that enables a reduction in time needed to determine an abnormality in steering angle.

A steering system according to an aspect of the present invention includes a position detector that detects a signal related to an absolute steering angle and an assist unit that acquires the signal related to the absolute steering angle while an ignition switch is off. The assist unit includes a counter that increases and decreases a count value based on a steering direction and an abnormality detecting unit that compares a past value and a current value of the count value to detect an abnormality in the absolute steering angle.

This configuration enables an abnormality in the absolute steering angle to be detected using the past value and the current value in the one counter. This is because the count value is a signal indicative of a change in the absolute steering angle. A configuration is possible in which a plurality of counters is provided to allow count values in the counters to be compared. However, compared to the configuration with the plurality of counters, the configuration according to the present aspect that detects an abnormality using a single counter enables a reduction in processing time for abnormality detection.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a steering system will be described below. The steering system in the present embodiment is an electric power steering system (EPS) that applies an assist force to a steering mechanism using a motor.

Figure 1:
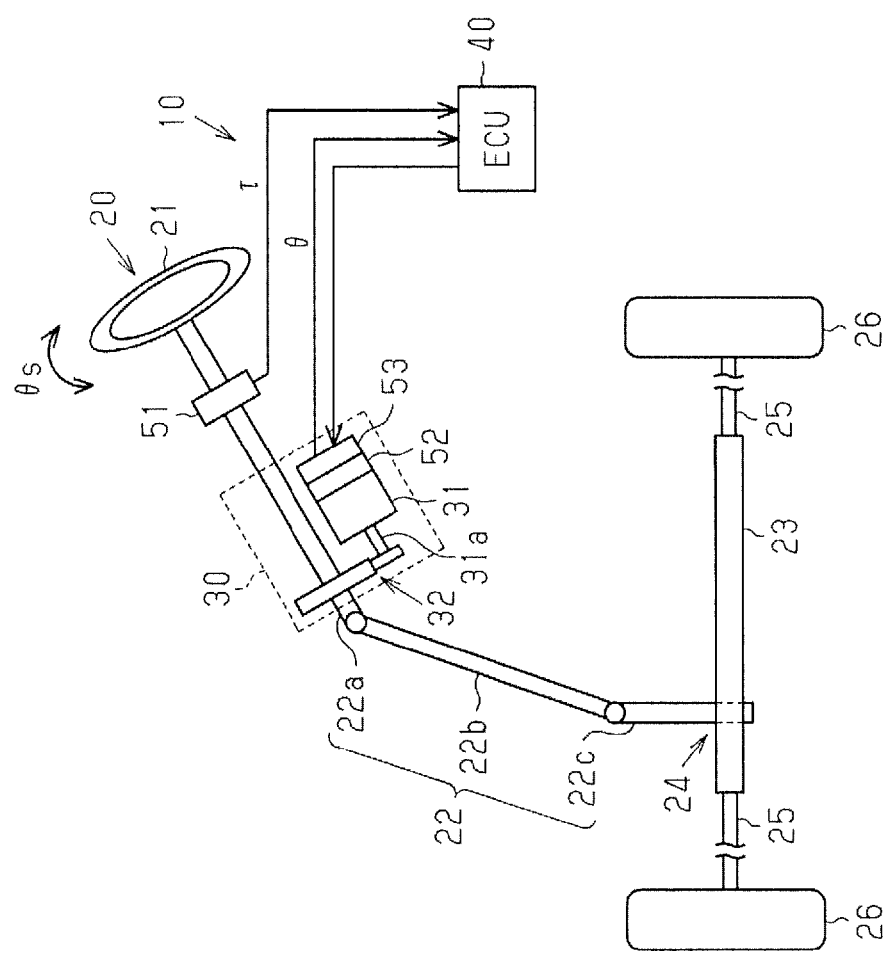
FIG. 1 is a block diagram depicting a configuration of a steering system in an embodiment.

As depicted in FIG. 1, the EPS 10 includes a steering mechanism 20 that steers steered wheels 26 based on a driver's operation of a steering wheel 21, a steering assist mechanism 30 that assists the driver's steering operation, and an electronic control unit (ECU) 40 that controls the steering assist mechanism 30.

The steering mechanism 20 includes the steering wheel 21 and a steering shaft 22 that rotates integrally with the steering wheel 21. The steering shaft 22 includes a column shaft 22a coupled to the steering wheel 21, an intermediate shaft 22b coupled to a lower end of the column shaft 22a, and a pinion shaft 22c coupled to a lower end of the intermediate shaft 22b. A lower end of the pinion shaft 22c is coupled to a rack shaft 23 extending in a direction that crosses the pinion shaft 22c. Rotary motion of the steering shaft 22 is converted into axial reciprocating linear motion of the rack shaft 23 via a rack-and-pinion mechanism 24. The reciprocating linear motion is transmitted to the right and left steered wheels 26 via tie rods 25 coupled to opposite ends of the rack shaft 23 to change the steered angles of the steered wheels 26. Thus, a vehicle traveling direction is changed.

The steering assist mechanism 30 includes a motor 31 that is a source of a steering assist force. A rotating shaft 31a of the motor 31 is coupled to the column shaft 22a via a speed reduction mechanism 32. The speed reduction mechanism 32 reduces the speed of rotation output from the motor 31 to transmit a torque generated by the motor 31 to the column shaft 22a. A steering torque $\tau$ of the motor 31 is applied to the steering shaft 22 as the steering assist force to assist the driver's steering operation.

The ECU 40 controls the motor 31 based on detection signals from various sensors provided in the vehicle. The various sensors include, for example, a torque sensor 51 and a rotation angle sensor 52. The torque sensor 51 is provided on the column shaft 22a, and the rotation angle sensor 52 is attached to the motor 31. The torque sensor 51 detects the steering torque $\tau$ applied to the steering shaft 22 as a result of the driver's steering operation. The rotation angle sensor 52 is provided on the motor 31 to output an electric signal according to the rotation angle θ of the rotating shaft 31a. The electric signal according to the rotation angle θ is a signal related to an absolute steering angle θs. For example, a magnetoresistive sensor (MR sensor) is adopted as the rotation angle sensor 52. The MR sensor has a bridge circuit including a plurality of magnetoresistive elements. The rotation angle sensor 52 generates a sin signal and a cos signal as the electric signal according to the rotation angle θ. The ECU 40 controls the motor 31 based on the steering torque τ detected by the torque sensor 51 and the electric signal generated by the rotation angle sensor 52.

The motor 31 is provided with an assist circuit 53. The assist circuit 53 outputs the signal related to the absolute steering angle θs detected by the rotation angle sensor 52, to the ECU 40, to assist the ECU 40 in calculating the absolute steering angle θs. The assist circuit 53 may be configured as a single integrated circuit (ASIC). The signal related to the absolute steering angle θs obtained by the rotation angle sensor 52 while an ignition switch is off (during an IG off state) is recorded in the assist circuit 53. While the ignition switch is on (during an IG on state), the assist circuit 53 outputs the signal related to the absolute steering angle θs and recorded in the assist circuit 53, to the ECU 40 via an interface 67. The ECU 40 executes calculation on the output from the rotation angle sensor 52 and the signal related to the absolute steering angle θs and output by the assist circuit 53, to output the absolute steering angle θs. The ECU 40 then records the absolute steering angle θs immediately before IG is turned off. During the IG off state, the ECU 40 is stopped, so no change in the absolute steering angle θs can be detected. That is, when the IG is turned on with the absolute steering angle θs having changed during the IG off state, the ECU 40 may perform control with the incorrect absolute steering angle θs. Thus, the absolute steering angle θs needs to be monitored by the rotation angle sensor 52 and the assist circuit 53 even during the IG off state.

To allow the signal related to the absolute steering angle θs to be detected with a reduction in power consumption of a battery, power from the battery is supplied to the rotation angle sensor 52 during the IG off state. For a reduction in battery consumption, during the IG off state, no power is supplied to the ECU 40, whereas power from the battery is supplied to the rotation angle sensor 52 and the assist circuit 53. Power may be intermittently supplied to the rotation angle sensor 52. The signal related to the absolute steering angle θs need not be constantly detected but may be detected at time intervals sufficient to determine whether the absolute steering angle θs has changed during the IG off state. The intermittent power supply enables a reduction in power consumption.

During the IG on state, the ECU 40 is supplied with power from the battery. The ECU 40 detects a rotation angle θ by calculating an arctangent value based on the sin signal and cos signal obtained by the rotation angle sensor 52. The ECU 40 uses the rotation angle θ to calculate the absolute steering angle θs. Based on the relationship between the rotation angle θ and the absolute steering angle θs, the absolute steering angle θs can be calculated using the rotation angle θ. During the IG off state, the ECU 40 records the absolute steering angle θs obtained immediately before the IG is turned off.

Now, a configuration of the assist circuit 53 will be described.

Figure 2:
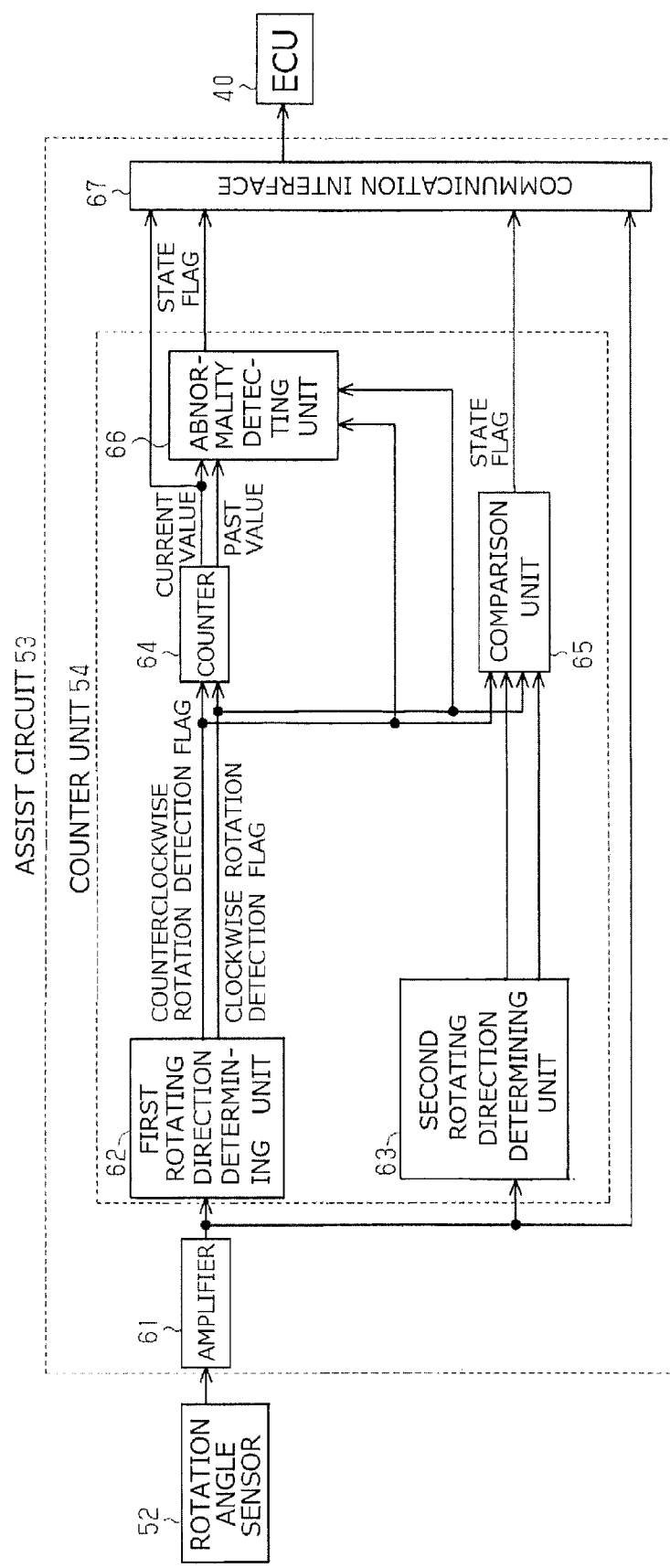
FIG. 2 is a schematic diagram depicting a configuration of an assist circuit in the embodiment.

As depicted in FIG. 2, the assist circuit 53 has an amplifier 61, a counter unit 54, and a communication interface 67.

The amplifier 61 amplifies the sin signal and cos signal generated by the rotation angle sensor 52. For the assist circuit 53, a configuration without the amplifier 61 may be adopted.

The counter unit 54 is a unit that performs counting based on the electric signal (sin signal and cos signal) generated by the rotation angle sensor 52 and generally has two functional sections. A first functional section detects the rotating direction of the motor 31 based on the rotation angle sensor 52 to update a count value according to the rotating direction of the motor 31 and the electric signal generated by the rotation angle sensor 52. A second functional section detects the result of determination of the rotating direction by the first functional section and an abnormality in count value.

As depicted in FIG. 2, the first functional section has a first rotating direction determining unit 62, a second rotating direction determining unit 63, and a counter 64.

The first rotating direction determining unit 62 determines the rotating direction (clockwise rotation or counterclockwise rotation) of the motor 31 based on the sin signal and cos signal amplified by the amplifier 61. Upon determining that the rotating direction of the motor 31 is counterclockwise, the first rotating direction determining unit 62 turns on a counterclockwise rotation detection flag indicating that the rotating direction of the motor 31 is counterclockwise. Upon determining that the rotating direction of the motor 31 is clockwise, the first rotating direction determining unit 62 turns on a clockwise rotation detection flag indicating that the rotating direction of the motor 31 is clockwise.

Figure 3:
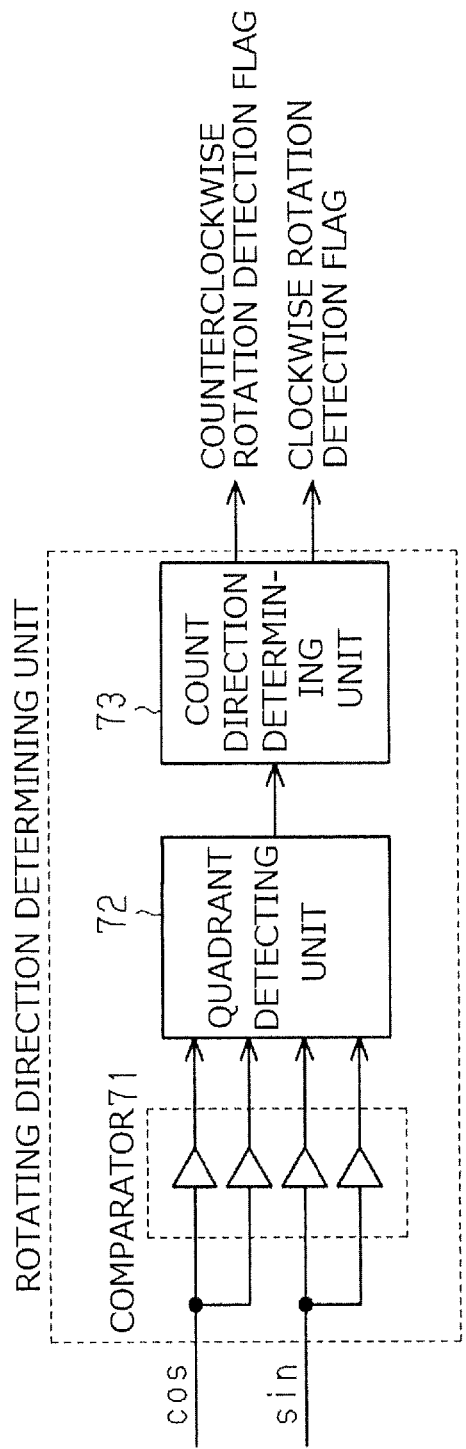
FIG. 3 is a schematic diagram of a rotating direction determining unit in the embodiment.

FIG. 3 is a schematic diagram of the rotating direction determining unit. The first rotating direction determining unit 62 and the second rotating direction determining unit 63 have the same configuration, and thus, the first rotating direction determining unit 62 will be described by way of example. The first rotating direction determining unit 62 includes a comparator 71, a quadrant detecting unit 72, and a count direction determining unit 73.

The comparator 71 generates a Hi level signal when the signal level of the sin and cos signals generated by the rotation angle sensor 52 has a value larger than a set threshold, and generates a Lo level signal when the signal level has a value smaller than the set threshold.

The quadrant detecting unit 72 determines to which of four possible quadrants the phase of the rotation angle θ of the motor 31 currently corresponds, based on a combination of the Hi level signal and the Lo level signal generated by the comparator 71. Specifically, the quadrant detecting unit 72 makes determination as follows.

(A1) When both the sin signal and the cos signal are at the Hi level. At this time, the rotation angle θ of the motor 31 is determined to correspond to a first quadrant.

(A2) When the sin signal is at the Hi level and the cos signal is at the Lo level. At this time, the rotation angle θ of the motor 31 is determined to correspond to a second quadrant.

(A3) When both the sin signal and the cos signal are at the Lo level. At this time, the rotation angle θ of the motor 31 is determined to correspond to a third quadrant.

(A4) When the sin signal is at the Lo level and the cos signal is at the Hi level. At this time, the rotation angle θ of the motor 31 is determined to correspond to a fourth quadrant.

The count direction determining unit 73 compares the current and last quadrants determined by the quadrant detecting unit 72. The count direction determining unit 73 turns on a counterclockwise rotation detection flag or a clockwise rotation detection flag when the current quadrant is different from the last quadrant. When the quadrant changes counterclockwise, for example, from the first quadrant to the second quadrant, the counterclockwise rotation detection flag is turned on, and the clockwise rotation detection flag is off. When the quadrant changes clockwise, for example, from the first quadrant to the fourth quadrant, the counterclockwise rotation detection flag is off, and the clockwise rotation detection flag is turned on. When no change occurs in quadrant, both the counterclockwise rotation detection flag and the clockwise rotation detection flag are off. When the count direction determining unit 73 is normal, it is impossible that both the counterclockwise rotation detection flag and the clockwise rotation detection flag are turned on. If both the counterclockwise rotation detection flag and the clockwise rotation detection flag are turned on, a state flag indicative of an abnormality is turned on.

As described above, the first rotating direction determining unit 62 converts the electric signal (sin signal and cos signal) generated by the rotation angle sensor 52 into the counterclockwise rotation detection flag and the clockwise rotation detection flag for the motor 31.

The counter 64 updates the count value based on the state flag for the first rotating direction determining unit 62. That is, the counter 64 increments the count value (increases the count value by one) when the counterclockwise rotation detection flag is on and decrements the count value (decreases the count value by one) when the clockwise rotation detection flag is on. Since the counterclockwise rotation detection flag or the clockwise rotation detection flag is turned on when the quadrant changes, the count value is updated each time the rotation angle θ changes by 90 degrees.

As depicted in FIG. 2, the second functional section has a comparison unit 65 and an abnormality detecting unit 66.

The comparison unit 65 compares the state flag for the first rotating direction determining unit 62 with the state flag for the second rotating direction determining unit 63 to determine whether or not the state flags match. Specifically, the comparison unit 65 compares the counterclockwise rotation detection flag for the first rotating direction determining unit 62 with the counterclockwise rotation detection flag for the second rotating direction determining unit 63. The comparison unit 65 also compares the clockwise rotation detection flag for the first rotating direction determining unit 62 with the clockwise rotation detection flag for the second rotating direction determining unit 63. When the counterclockwise rotation detection flag for the first rotating direction determining unit 62 does not match the counterclockwise rotation detection flag for the second rotating direction determining unit 63, the comparison unit 65 turns on a state flag indicative of the mismatch. When the clockwise rotation detection flag for the first rotating direction determining unit 62 does not match the clockwise rotation detection flag for the second rotating direction determining unit 63, the comparison unit 65 turns on a state flag indicative of the mismatch.

The abnormality detecting unit 66 detects an abnormality in count value based on the count value (current value and last value) in the counter 64 and the state flags (counterclockwise rotation detection flags and clockwise rotation detection flags) for the first rotating direction determining unit 62 and the second rotating direction determining unit 63. When no abnormality is detected, the abnormality detecting unit 66 outputs the current value to the ECU 40 when the IG is turned on, as assistance data for calculation of the absolute steering angle θs. That is, the ECU 40 calculates the first absolute steering angle θs after the IG is turned on, taking into account the absolute steering angle θs recorded in the ECU 40 immediately before the IG is turned off, the rotation angle θ obtained from the rotation angle sensor 52 during the IG on state, and the amount of change in steering angle derived from the count value.

The abnormality detecting unit 66 detects an abnormality in the following four cases. Upon detecting an abnormality, the abnormality detecting unit 66 turns on a state flag indicative of the abnormality.

(B1) When the counterclockwise rotation detection flag is on, the clockwise rotation detection flag is off, a numerical difference is present between the current value and last value of the count value, and the current value is larger than the last value.

(B2) When the counterclockwise rotation detection flag is off, the clockwise rotation detection flag is on, a difference is present between the current value and last value of the count value, and the current value is smaller than the last value.

(B3) When the counterclockwise rotation detection flag is off, the clockwise rotation detection flag is off, and the current value and the last value do not match.

(B4) When the counterclockwise rotation detection flag is on and the clockwise rotation detection flag is on.

The communication interface 67 transmits signals for the count value, the state flag, and the rotation angle θ of the motor 31 output by the rotation angle sensor 52, to the ECU 40 while the IG is on.

The ECU 40 is active only during the IG on state. This is to suppress the power consumption of the battery during the IG off state. During the IG on state, the ECU 40 retrieves various signals, that is, signals related to the count value, the state flag, and the absolute steering angle θs output by the rotation angle sensor 52. However, the assist circuit 53 need not always operate during the IG on state, and it is also preferable that the count value, the state flag, and the like obtained from the assist circuit 53 are obtained only immediately after the IG is turned on.

During the IG on state, power is supplied to all of the components such as the rotation angle sensor 52, the assist circuit 53, and the ECU 40. However, the assist circuit 53 need not constantly be supplied with power during the IG on state. Thus, first, the rotation angle sensor 52 is supplied with power to output an electric signal corresponding to the rotation angle θ of the motor 31. In accordance with the output from the rotation angle sensor 52, the counter unit 54 outputs the rotating direction of the motor 31, the count value, and the state flag. The output from the rotation angle sensor 52 and the output from the counter unit 54 are transmitted to the ECU 40 via the communication interface 67 during the IG on state. The ECU 40 calculates the absolute steering angle θs from these outputs.

During the IG off state, only some of the components are supplied with power. That is, power is supplied to the rotation angle sensor 52, the amplifier 61, the first rotating direction determining unit 62, the second rotating direction determining unit 63, and the counter 64. No power is supplied to the ECU 40 or the communication interface 67. Thus, the electric signal output by the rotation angle sensor 52 and corresponding to the rotation angle θ of the motor 31 is recorded in the counter 64 as the current value and the last value of the count value. Thus, the electric signal is not transmitted to the ECU 40 during the IG off state.

Now, operations of the EPS 10 will be described.

Normally, while the IG is on, the ECU 40 calculates the rotation angle θ of the motor 31 based on the electric signal (sin signal and cos signal) generated by the rotation angle sensor 52 and calculates the absolute steering angle θs using the rotation angle θ. The ECU 40 calculates a needed assist force based on the steering torque τ and the absolute steering angle θs, and controls the power supply to the motor 31 to allow the assist force to be applied to the steering mechanism 20.

When the IG is turned off, the counter 64 updates the count value depending on the rotating direction of the motor 31 determined by the first rotating direction determining unit 62 even during the IG off state. Thus, even if the absolute steering angle θs changes during the IG off state due to the driver's movement of the steering wheel 21 or the like, the change is monitored.

When the IG, which has been off, is turned on, if the comparison unit 65 finds a mismatch in the rotating direction and the state flag indicative of an abnormality is detected, the correct value for the absolute steering angle θs fails to be detected until a normal state flag is detected. Thus, the use of the EPS 10 utilizing the absolute steering angle θs is stopped. This is because malfunction may occur when the EPS 10 uses the absolute steering angle θs while the absolute steering angle θs is unknown, for example, while it is unknown whether the absolute steering angle θs is zero degree or 360 degrees. When the normal state flag is detected during the IG on state, the ECU 40 calculates the correct value for the absolute steering angle θs using the absolute steering angle θs obtained immediately before the IG is turned off, the rotation angle θ obtained from the rotation angle sensor 52 and the count value. The ECU 40 then utilizes the absolute steering angle θs to control the apparatus.

The above-described steering system can provides advantageous effects described below.

(1) The last value and the current value in the counter 64 are compared to reduce the time needed for the abnormality detecting process. A method is available in which two counters 64 are provided to allow count values in these counters to be compared to detect an abnormality. However, the use of a single counter 64 for comparison of the last value and the current value enables a further reduction in the processing time needed to detect an abnormality. That is, if the count values in the two counters 64 are compared, data are collected from the two counters 64 and checked for a match, leading to the need for time to collect double the amount of data. In contrast, when the last value and the current value in the counter 64 are compared, data may be collected from the counter 64, eliminating the need to collect double the amount of data. As a result, the method of using the single counter 64 to compare the last value with the current value enables a further reduction in the processing time needed to detect an abnormality compared to the method of using the two counters 64. Furthermore, compared to the use of the two counters 64 for comparison, the use of the single counter 64 enables simplification of the configuration in the assist circuit 53 and reduction of the number of members of the system. Manufacturing costs are expected to be further reduced.

(2) During the IG off state, no power is supplied to the ECU 40, and the rotating direction of the motor 31, the count value, and the state flag are recorded by the counter unit 54. This allows battery consumption to be suppressed. During the IG on state, power is supplied to the ECU 40, and the ECU 40 calculates the absolute steering angle θs from the count value obtained by the counter unit 54 during the IG off state and the electric signal (sin signal and cos signal) generated by the rotation angle sensor 52. With the battery consumption during the IG off state suppressed, a change in absolute steering angle θs can be monitored which results from the driver's operation of the steering wheel 21 during the IG off state.

(3) The first rotating direction determining unit 62 and the second rotating direction determining unit 63 allow the rotating direction of a steering shaft to be determined. Then, abnormality detection can be performed using the rotating direction of the steering shaft and the past value and current value in the counter 64. Furthermore, a plurality of first rotating direction determining units 62, a plurality of second rotating direction determining units 63, and a plurality of comparison units 65 may be provided to detect an abnormality, allowing the reliability of the determined absolute steering angle to be improved.

(4) Abnormality detection is performed using the current value and the last value, which is the nearest past value, to allow an abnormality to be detected in the latest state with time lag further reduced.

(5) Intermittent power supply to the rotation angle sensor 52 and the assist circuit 53 enables a further reduction in battery consumption compared to constant power supply.

The above-described embodiment may be changed as follows. Other embodiments described below may be combined together to the extent that no technical contradiction occurs.

In the present example, the present invention is implemented as the electric power steering system. However, a hydraulic power steering system or a steer-by-wire steering system may be implemented. Furthermore, the absolute steering angle θs calculated by the ECU 40 may be shared with other in-vehicle systems such as a brake, a back guide system, and a vehicular stability control system that use the absolute steering angle. The present example is also applicable to normal steering systems that do not assist the steering operation. In this case, control for assisting the steering operation is not performed, and thus, the ECU 40 for steering need not necessarily be provided. With the rotation angle sensor 52 and the assist circuit 53 unchanged, the calculation of the absolute steering angle θs may be executed by a controller for an in-vehicle system other than the steering system.

In the present example, a change in the rotation angle θ of the rotating shaft 31a of the motor 31 is detected by the rotation angle sensor 52 to allow the absolute steering angle θs to be calculated. However, the rotation angle of the steering shaft 22 may be detected by the rotation angle sensor 52.

In the present example, the rotation angle sensor 52 that detects the rotation angle θ of the rotating shaft 31a of the motor 31 is used as a position detector that outputs a signal related to the absolute steering angle θs. However, a potentiometer that detects the amount of axial movement of the rack shaft 23 may be adopted.

In the present example, the MR sensor is used as the rotation angle sensor 52. However, a Hall sensor may be used. Alternatively, for example, a magnetic impedance element, a Faraday element, or a superconducting quantum interference device (SQUID) may be used. Besides the magnetic sensor, an ultrasonic sensor or an encoder may be adopted as the rotation angle sensor 52.

In the present example, the rotation angle sensor 52 serving as a position detector is provided on the column shaft 22a. However, the rotation angle sensor 52 may be provided on any portion of the steering shaft 22. When the amount of axial movement of the rack shaft 23 is used as a signal related to the absolute steering angle θs, the potentiometer serving as a position detector that detects the amount of axial movement of the rack shaft 23 may be provided on the rack shaft 23.

In the present example, the last value and the current value of the count value are compared to detect an abnormality in the counter 64. However, the current value may be compared with a value at another past point in time. For example, the last but one value may be used for the comparison when the absolute steering angle θs is known to be unchanged. Alternatively, the last but one value, the last value, and the current value may be compared with one another or comparison may be performed on time series changes since any point in time as needed. For example, if, due to the intermittent power supply to the rotation angle sensor 52, the abnormality detecting unit 66 need not frequently compare the current value with the past value, that is, may perform one comparison for every several count values, the current value may be compared with the last but one value.

In the present example, the assist circuit 53 may be constantly supplied with power during the IG on state. That is, the assist circuit 53 is constantly supplied with power even during the IG on state to allow the count value to be updated. Thus, the ECU 40 need not record the absolute steering angle θs obtained immediately before the IG is turned off. The ECU 40 calculates the absolute steering angle θs using the count value and the rotation angle θ obtained from the rotation angle sensor 52 during the IG on state.

In the present example, the first rotating direction determining unit 62 and the second rotating direction determining unit 63 are provided as the circuit configuration. However, a mechanical configuration may be provided which performs counting in conjunction with the motion of gears or the like. For example, a configuration may be provided in which a gear is attached to the motor 31 so that, when the gear rotates in conjunction with the motor 31, a mechanical counter 64 attached to the gear is used to perform automatic counting. That is, the mechanical counter 64 may be configured to mechanically increase the count value as the gear rotates and teeth of the gear move. In contrast, when the motor 31 rotates in the opposite direction, the count value mechanically decreases. Such a configuration eliminates the need for the first rotating direction determining unit 62 and the second rotating direction determining unit 63.

In the present example, the first rotating direction determining unit 62 and the second rotating direction determining unit 63 are provided. However, the first rotating direction determining unit 62 and the second rotating direction determining unit 63 may be omitted. For example, it is sufficient to be able to determine whether or not the motor 31 has rotated, with the rotating direction of the motor 31 not determined. Given that a rotation flag is turned on when the motor 31 has rotated and is off when the motor 31 has not rotated, the abnormality detecting unit 66 detects an abnormality in the following two cases.

(C1) When the rotation flag is off and a specified numeral difference is present between the current value and the past value of the count value.

(C2) When the rotation flag is on and the specified numeral difference is not present between the current value and the past value of the count value.

In the present example, the second rotating direction determining unit 63 and the comparison unit 65 are provided. However, the second rotating direction determining unit 63 and the comparison unit 65 need not necessarily be provided. In that case, it is impossible that the comparison unit 65 determines an abnormality in the first rotating direction determining unit 62 and the second rotating direction determining unit 63, but the abnormality detecting unit 66 can detect an abnormality in the count value in the counter 64. On the contrary, three or more second rotating direction determining units 63 may be provided. In that case, the comparison unit 65 using the second rotating direction determining units 63 detects an abnormality in each of the second rotating direction determining units 63.

What is claimed is:

1. A steering system comprising:
a position detector that is configured to detect a signal related to an absolute steering angle;
an assist unit that is configured to acquire the signal related to the absolute steering angle while an ignition switch is off;
a steering operation shaft that is configured to make linear motion in conjunction with rotation of a steering shaft to steer steered wheels; and
a motor that is configured to apply an assist force to the steering shaft or the steering operation shaft,
wherein the assist unit includes:
 a counter that is configured to increase and decrease a count value based on a steering direction when the ignition switch is off; and
 an abnormality detecting unit that is configured to compare the count value obtained when the ignition switch is off and a count value obtained immediately before the ignition switch is turned off to detect an abnormality in the absolute steering angle.

2. The steering system according to claim 1, wherein
the assist unit includes a rotating direction determining unit that is configured to determine a rotating direction as the steering direction based on the acquired signal,
the counter is configured to update the count value based on the rotating direction determined by the rotating direction determining unit, and
the abnormality detecting unit is configured to detect an abnormality in the absolute steering angle based on the rotating direction of the steering shaft determined by the rotating direction determining unit and a result of comparison between the past value and the current value.

3. The steering system according to claim 2, wherein
the assist unit includes a comparison unit and a plurality of the rotating direction determining units, and
the comparison unit is configured to compare the rotating directions determined by the rotating direction determining units to detect an abnormality in a determination result for the rotating direction.

4. The steering system according to claim 1, wherein
the position detector is configured to generate, as the signal related to the absolute steering angle, an electric signal according to an amount of rotation of the motor.

5. The steering system according to claim 1,
wherein the steering operation shaft is configured to make linear motion in conjunction with rotation of the steering shaft to steer the steered wheels, wherein
the position detector is configured to generate, as the signal related to the absolute steering angle, an electric signal according to an amount of rotation of the steering shaft or an amount of displacement of the steering operation shaft.

6. The steering system according to claim 4, further comprising:
   a controller that is configured to control the motor based on a signal related at least to a steering torque and the steering angle, wherein
   while the ignition switch is off, power supply to the controller is stopped but power is continuously supplied to the position detector and the assist unit.

7. The steering system according to claim 1, wherein the steering system is configured to intermittently drive the position detector and the assist unit.

8. The steering system according to claim 6, wherein the signal related to a steering torque is detected by a torque sensor.

* * * * *